United States Patent [19]
Dickson et al.

[11] Patent Number: 5,992,864
[45] Date of Patent: Nov. 30, 1999

[54] MOTORLESS HUMAN-POWERED SCOOTER

[76] Inventors: Brett G. Dickson, 760 Lytton Ave., Palo Alto, Calif. 94301; Rory W. Fuerst, 101 Isabella Ave., Atherton, Calif. 94027

[21] Appl. No.: 09/032,309

[22] Filed: Feb. 27, 1998

Related U.S. Application Data

[60] Provisional application No. 60/038,344, Feb. 27, 1997.

[51] Int. Cl.$^6$ ............................................. B62M 1/00
[52] U.S. Cl. ............................................. 280/87.041
[58] Field of Search ............ 280/87.041, 288.4, 280/220, 281.1, 264; 180/219

[56] References Cited

U.S. PATENT DOCUMENTS 5,470,089 11/1995 Whitson et al. .................. 280/87.041
5,899,474 5/1999 Grutzik .......................... 280/229

*Primary Examiner*—J. J. Swann
*Assistant Examiner*—Kevin McKinley
*Attorney, Agent, or Firm*—Burns, Doane, Swecker & Mathis, L.L.P.

[57] ABSTRACT

A motorless human-powered scooter is disclosed having a sturdy frame with a fixed position rear wheel and a steerable fork which carries a steerable front wheel. The front and rear wheels are substantially equal in diameter and each has a diameter of about one-third the total length of the scooter. A preferred manner for attaching the scooter's main tube to its bottom tube and deck is disclosed.

14 Claims, 4 Drawing Sheets

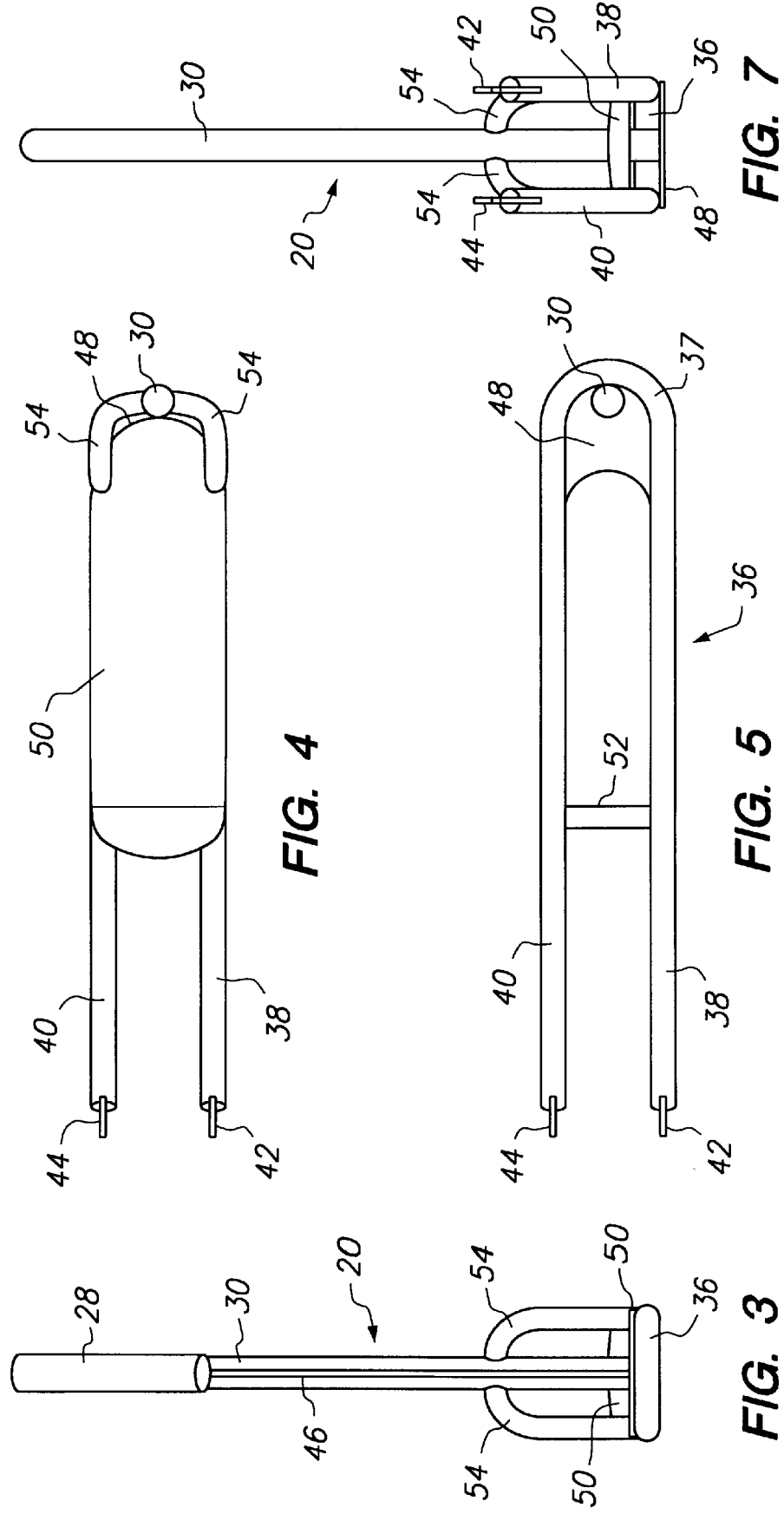

MOTORLESS HUMAN-POWERED SCOOTER

This application claims priority from Provisional application 60/038,344 filed Feb. 27, 1997.

FIELD OF THE INVENTION

This invention relates to scooters. In particular, it pertains to motorless human-powered scooters.

BACKGROUND OF THE INVENTION

Outdoor sports such as bicycling and skateboarding have recently become very popular. Another exciting and challenging outdoor sport is scooter riding, which is similar both to skateboarding and to bicycling. Human powered-scooters are known in the art. Previous scooters generally have been designed for nonvigorous recreational activities, such as children's toys and light recreational use by adults.

Motorless scooters are two-wheeled vehicles which, unlike bicycles, do not use a gear and chain mechanism for power. Instead, scooters are propelled only by the rider pushing with his feet. Human powered scooters are safe and exciting alternatives to stationary bikes or treadmills.

The scooter rider may engage in jumping in a manner similar to jumping a bicycle or a skateboard. Jumping and landing increase the force placed on the scooter and the frame may bend or break if it is not strong enough to withstand these forces.

Previous scooters have had two small wheels or one small wheel and one larger wheel. For example, U.S. Pat. Nos. 1,701,410, 1,661,307, 1,535,167 and 1,615,403 show scooters with two small wheels. U.S. Pat. No. 3,336,046 shows a scooter with a small front wheel and a larger rear wheel.

Other scooters have had driving or propulsion mechanisms, such as U.S. Pat. Nos. 4,761,014 and 5,224,724.

U.S. Pat. No. 5,470,089 shows a scooter with two bicycle-sized wheels. The frame of the scooter is constructed such that two rigid and spaced rods extend downwardly and then horizontally. Several spaced links are perpendicularly coupled between the rods. A plate is coupled to the frame to define a platform where the rider may stand.

None of these previous scooters have had sufficiently sturdy construction to withstand the vigorous riding activity seen with current riders. There exists a need for scooters which withstand forces placed on the frame during vigorous riding. The previous scooters do not provide an apparatus primarily for the purpose of adult recreation and exercise which are constructed so that the frame of the scooter will withstand increased forces associated with vigorous use.

REFERENCES

The following references relate to scooters and are incorporated by reference:

U.S. Pat. No. 1,535,167;
U.S. Pat. No. 1,615,403;
U.S. Pat. No. 1,661,307;
U.S. Pat. No. 1,701,410;
U.S. Pat. No. 3,336,046;
U.S. Pat. No. 4,761,014;
U.S. Pat. No. 5,224,724;
U.S. Pat. No. 5,470,089;

SUMMARY OF THE INVENTION

The present invention is a motorless human-powered scooter with a sturdy design to withstand vigorous riding. More particularly, it is designed to resist bending and breakage under increased forces encountered during vigorous riding and exercise activities.

This invention is directed to a motorless human-powered scooter having a frame with a fixed position rear wheel and a steerable fork which carries a steerable front wheel. The front and rear wheels are substantially equal in diameter and each has a diameter of about one-third the total length of the scooter. The frame has an angled head tube which carries the steerable fork so as to apply caster forces to the front wheel.

The head tube is joined to the top of the curved main tube by a main gusset. The bottom of the main tube is perpendicularly joined to the inside of the center of the curved region of a U-shaped bottom tube. The bottom U-shaped tube has two legs which extend horizontally rearward from the main tube and then slope upward to carry a dropout to mount the rear wheel.

The main gusset plate is tapered and curved with its larger radius of curvature to match the inner curve of the main tube. The main gusset plate is joined to the main tube at periodic areas along the length of the main tube. The bottom of the main gusset is joined to the bottom tube on the top side at the center of the U. Attached to the bottom tube is a rigid bottom plate, which is adjacent to the center of the U as reinforcement. The main tube is also affixed to the bottom plate.

The bottom tube also has a rigid metal deck plate attached to its top surface as additional reinforcement, which also provides a deck for the rider to stand upon, that extends from about the main tube to the rear wheel.

To stabilize the structure of the bottom tube, a bridge tube spans between the legs of the U-shaped bottom tube. Additionally, a pair of curved reinforcement tubes attached to the opposing sides of the main tube and angling outward to rigidly attach to the metal deck plate behind the main tube, reinforce the connection between the main tube and the rest of the frame.

The scooter may also be equipped with handlebars, a kickstand, a warning bell and one or more hand activated brakes which apply friction braking forces to one or both of the front and rear wheels. A rear fender may surround the upper portion of the rear wheel and have a handle affixed to its top surface so that the rear end of the scooter may be manipulated. The deck plate may slope upward near the rear wheel.

The disclosed scooter includes aspects which may form the basis of a utility patent, a design patent, or, if available, a utility model.

BRIEF DESCRIPTION OF THE DRAWINGS

This invention is best understood with reference to the drawings which include the following figures:

FIG. 3 is a front view of the scooter frame;
FIG. 4 is a top view of the scooter deck plate;
FIG. 5 is a top view of the bottom tube without the deck plate;
FIG. 7 is a rear view of the scooter frame; and

DETAILED DESCRIPTION OF THE INVENTION

Figure 1:
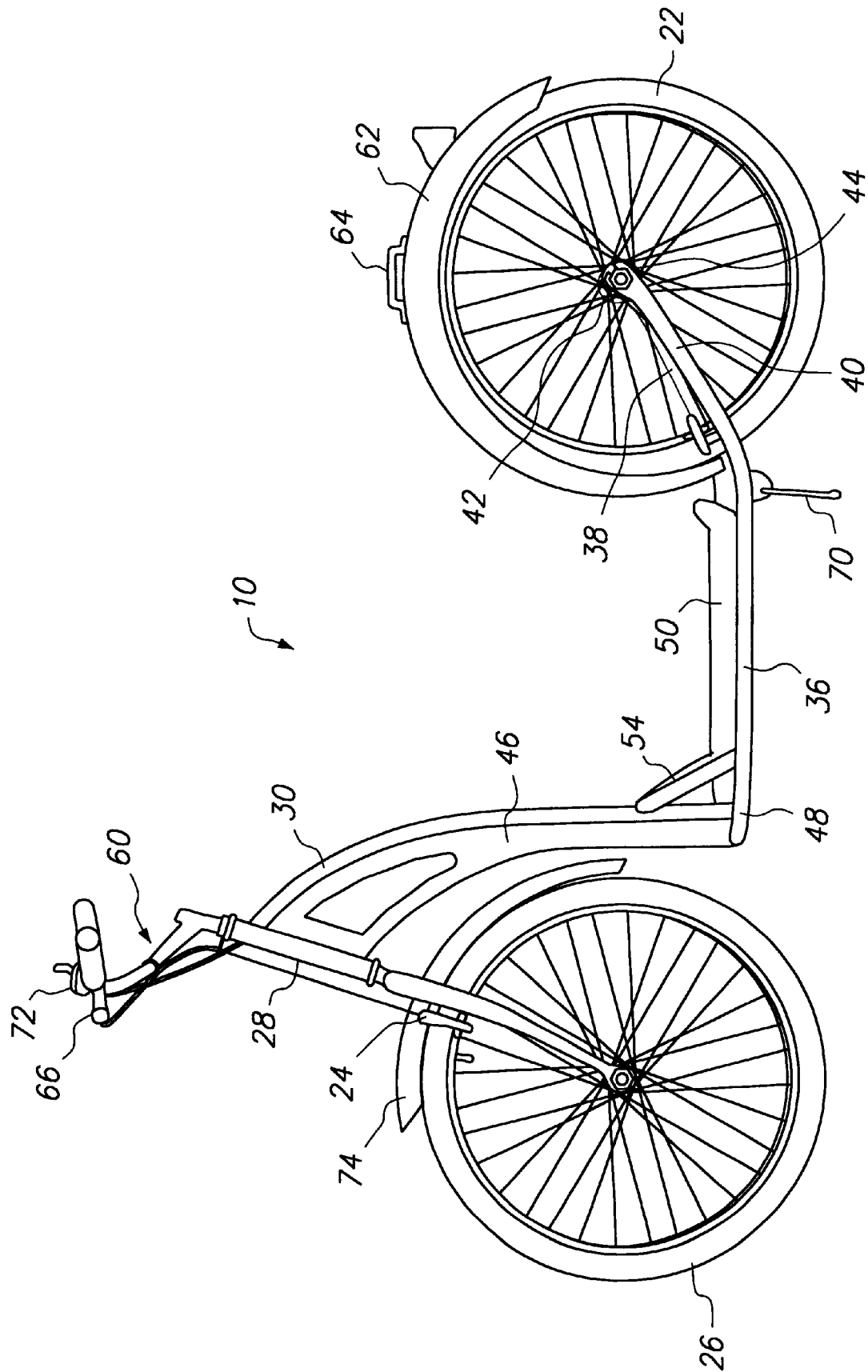
FIG. 1 is a side view of the scooter.

Turning now to FIGS. 1–7, a scooter 10 having a frame 20 is shown in which the head tube 28 and main tube 30 are joined at the top of the main tube 30 by a main gusset 46 at approximately a 45 degree angle. It is preferred that the main tube 30, the head tube 28, and the main gusset 46 are welded together. The main tube 30, head tube 28 and main gusset 46 are preferably made with a high tensile steel, although other strong materials are contemplated. The main gusset 46 extends the length of the main tube 30 where it is attached to the top of the bottom tube 36.

Handlebars 60 are affixed to the head tube 28. An warning bell 72 may be attached to the handlebars 60. One or two handbrakes 66 are attached to the handlebars 60. These may be levered brakes which apply friction forces to the wheels when squeezed. There may be front brakes, rear brakes or both on the scooter.

Figure 2:
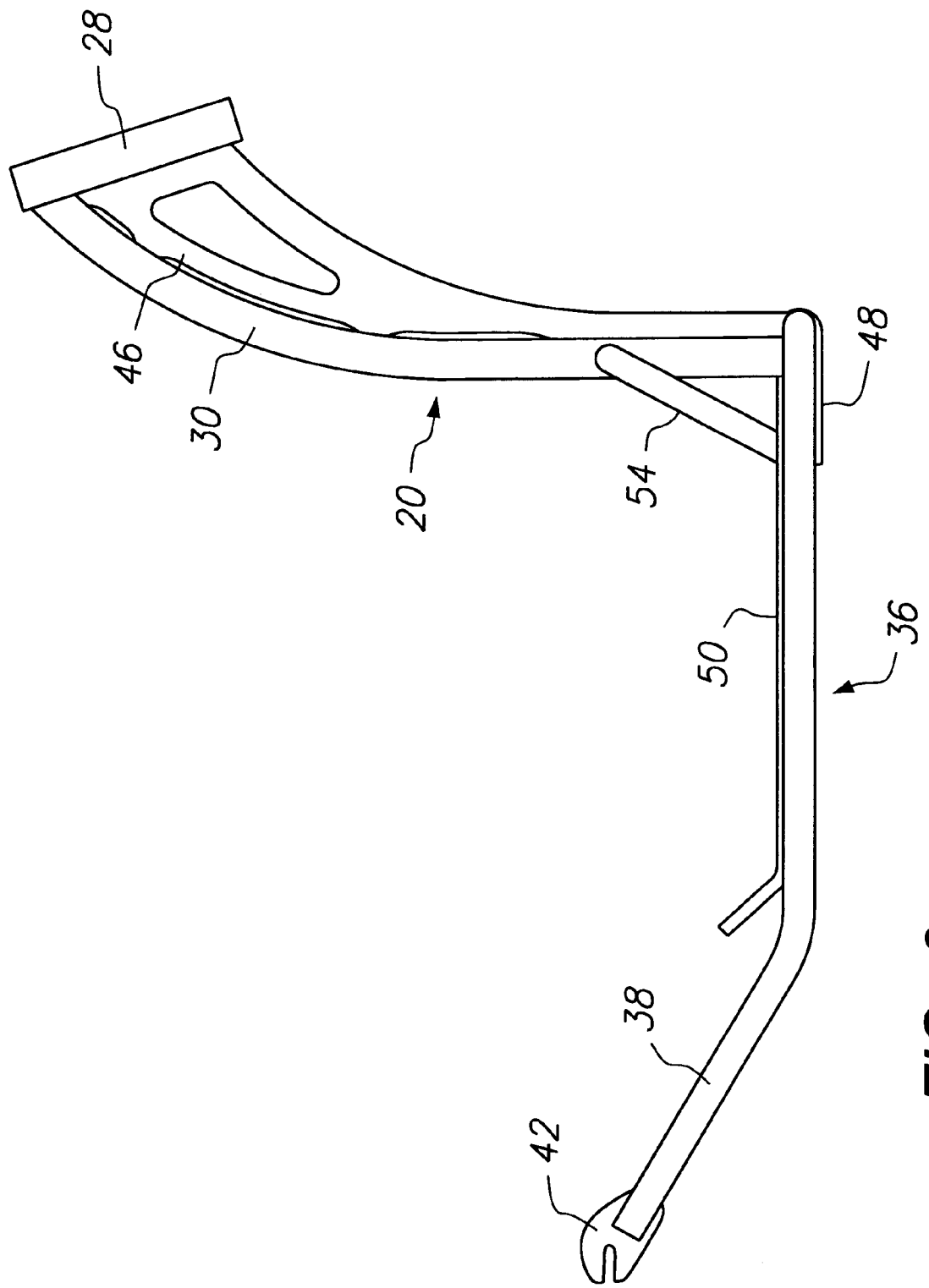
FIG. 2 is a side view of the scooter frame.
Figure 6:
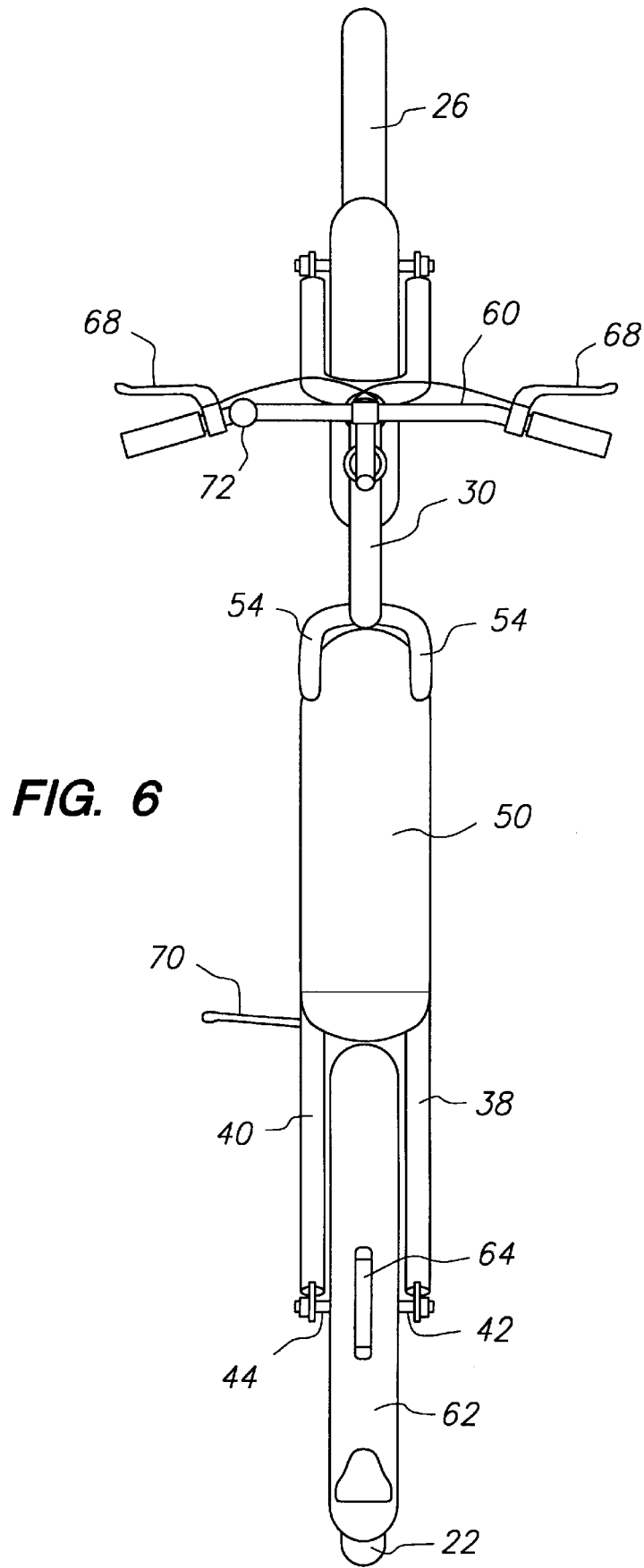
FIG. 6 is a top view of the scooter.

Best illustrated in FIGS. 2 and 5, the bottom tube 36 is a "U" shaped tube with a substantially semi-circular portion 37 and two legs 38, 40. The legs 38, 40 extend the length of the deck plate 50 where they then slope up at about 45 degrees to support the rear wheel 22 of the scooter. The deck plate 50 may be about one-eighth inch thick and may be made of steel and stamped with holes in order to vary its weight. Both legs 38, 40 of the bottom tube 36 terminate with dropouts 42, 44 which carry the rear wheel 22 of the scooter. A bridge tube 52 is attached between the legs of the bottom tube 38, 40 at approximately the point where the legs 38, 40 begin to incline so as to allow connection to a bicycle-sized wheel and tire. It is preferred that the bridge tube 52 be welded between the legs 38, 40. The bicycle-sized wheel and tire is a 22, 24, 26 or 27 inch diameter wheel and tire. Each wheel is about one-third the length of the scooter. For example, each wheel and tire ranges from about 25% to 40% of the total length of the scooter.

As shown in FIGS. 5 and 7, the main tube 30 extends down between the legs 38, 40 of the bottom tube 36 at the top of the "U" and is attached, preferably by welding, to the bottom plate 48. The bottom plate 48 is shaped such that it may be attached to the bottom of the bottom tube 36. Reinforcement tubes 54 are attached to the main tube 30, extend out and away from the main tube 30 and are attached to the top of the legs 38, 40 of the bottom tube.

The rear wheel 22 has a rear fender 62 which substantially covers the upper portion of the rear wheel 22 and acts to shield the rider from debris which may kick up off of the rear wheel 22. A handle 64 is mounted onto the top of the rear fender 62 so as to allow the rider to easily lift, move, or maneuver the scooter. The front wheel 26 has a front fender 74 which also acts to shield the rider from debris which may kick up off of the front wheel 26.

A kickstand 70 is affixed to the rear portion of one of the legs 38, 40 of the bottom tube. It is affixed at a point which will allow the scooter to stand on its own without falling over when the kickstand 70 is used.

The construction of the main tube 28, the reinforcement tubes 54, the deck plate 50, the bottom tube 36 and the bottom plate 48 give the scooter a strong structure and allow it to withstand the forces encountered during vigorous riding.

The strength and durability of the scooter and its frame design were tested. In a first test, the frame was rigidly mounted at the two axles and a 100 kg load was applied to the deck, to simulate aggressive riding, at a frequency of 10 hertz. After 150,000 test cycles, the flame was free from ruptures, remarkable deformation or distortion.

In a second test, the frame of the scooter was rigidly mounted in a fixed position at the two axles of the scooter. An increasing load was applied to the deck of the scooter at a steady speed of 50 mm/minute. After applying a weight of about 350 kg, the frame had no cracks or deformation.

Although this invention has been exemplified as a motorless scooter, it is also contemplated that a motor may be added. A modest power electric or gas motor which drives the rear wheel by belt or chain connection or by friction engagement with the wheel, such as is popular with motorbikes and the like, may be added to the frame of the scooter. Hand or foot controls may be added which control the speed of the motor.

What is claimed:

1. A motorless scooter for a rider comprising:

a frame carrying a fixed position rear wheel and a steerable fork which carries a steerable front wheel, where the front and rear wheel are substantially equal in diameter and each having a diameter about one-third the total length of the scooter;

the frame comprising an angled head tube for carrying the steerable fork and applying caster forces to the front wheel;

the head tube being joined to a first end of a curved main tube and a second end distal to the first end of the main tube being perpendicularly joined to the inside of the center of the curved region of a U-shaped bottom tube, where the U-shaped bottom tube has two legs extending rearward from the main tube and sloping upward, each leg carrying a drop out for mounting the rear wheel;

the head tube also being joined to a tapered gusset plate curved to match the curve of the main tube and joined to the main tube at least periodically along its length, and at a second end joined to the bottom tube at the top of the center of the U-shaped bottom tube, the bottom tube additionally carrying a rigid bottom plate attached to its underside adjacent to the center of the U as reinforcement, the main tube being affixed to the bottom plate, and the bottom tube additionally carrying a rigid metal deck plate attached to its top surface thereby providing additional reinforcement, and the deck extending from about the main tube to the rear wheel for the rider to stand upon;

a bridge tube spanning between the legs of the bottom tube; and a pair of curved reinforcement tubes attached at one end to the opposing sides of the main tube and angling outward to rigidly attach to the metal deck plate behind the main tube to reinforce the connection between the main tube and the remainder of the frame.

2. The scooter of claim 1 wherein the reinforcement tubes are welded to the main tube and welded to the deck plate.

3. The scooter of claim 1 wherein the main tube is welded to the bottom tube and welded to the bottom plate.

4. The scooter of claim 1 wherein the bridge tube is welded between the legs of the bottom tube.

5. The scooter of claim 1 wherein the main gusset is welded to the bottom tube.

6. The scooter of claim 1 additionally comprising a standard bicycle handlebar attached to and steering the steerable fork.

7. The scooter of claim 1 additionally comprising a rear fender surrounding the upper portion of the rear wheel.

8. The scooter of claim 7 wherein the rear fender carries a handle on its top surface for manipulating the rear end of the scooter.

9. The scooter of claim 1 wherein the deck plate slopes upward near the rear wheel.

10. The scooter of claim 1 additionally comprising a brake activated by a lever on the handlebars which in turn applies a friction braking force to one of the wheels.

11. The scooter of claim 10 comprising a brake on the front wheel and a brake on the rear wheel.

12. The scooter of claim 1 additionally comprising a kickstand.

13. The scooter of claim 9 wherein the kickstand is a lowerable kickstand attached to the frame such that the kickstand supports the scooter in an upright position when lowered.

14. The scooter of claim 1 additionally comprising a warning bell affixed to the handlebars.

* * * * *